March 20, 1928. 1,663,044

J. J. FURLONG

ANTITHEFT DEVICE FOR AUTOMOBILES

Filed Feb. 26, 1926

INVENTOR:
James J. Furlong
by Ray A. Gehr
ATTORNEY.

Patented Mar. 20, 1928.

1,663,044

UNITED STATES PATENT OFFICE.

JAMES J. FURLONG, OF YOUNGSTOWN, OHIO.

ANTITHEFT DEVICE FOR AUTOMOBILES.

Application filed February 26, 1926. Serial No. 90,946.

The invention relates to means designed to be detachably locked to motor vehicles having glass windshields and adapted by obstructing the vision of the driver to prevent unauthorized operation and theft of the vehicle.

One of the main objects of the invention is to provide a device of the character in question which is universally applicable to automobiles having glass windshields.

Another object of the invention is the provision of a device of the character in question that can quickly and easily be attached and detached.

A further object of the invention is the provision of a vision obstructor of the character in question which can be reduced to small compass when not in operative position on the windshield.

A further object of the invention is the provision of a device of the character in question that is neat in appearance, simple in construction and susceptible of being produced at moderate cost.

Other objects of the invention more or less incidental or ancillary to the foregoing will appear in the following description which sets forth in connection with the accompanying drawing preferred embodiments of the invention.

In the drawing, Fig. 1 is a vertical section through the upper part of the body of an automobile showing my improved device locked to the windshield of the machine.

Fig. 2 is an enlarged section on the line 2—2, Fig. 1.

Figure 1:
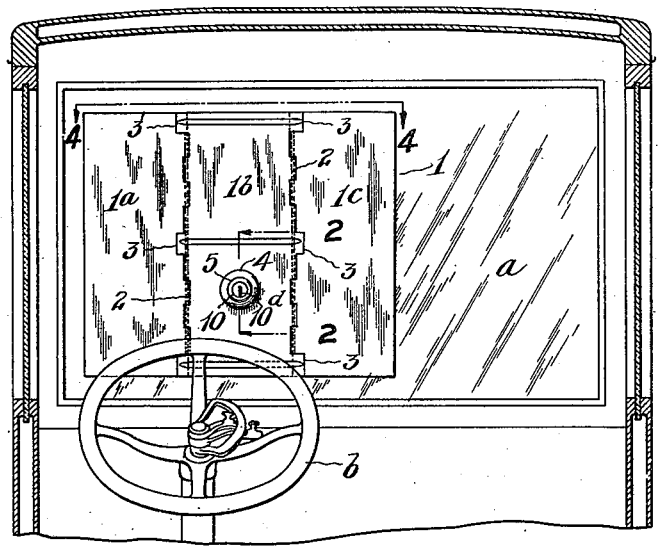
Figure 4:
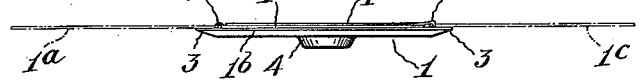
Fig. 4 is an enlarged top edge view of the device illustrated in Fig. 1 detached from the windshield and folded.
Figure 2:
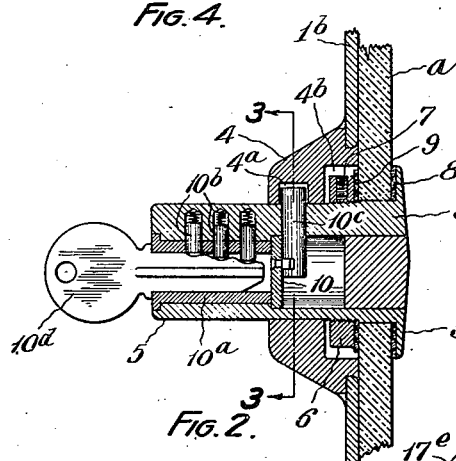
Figure 3:
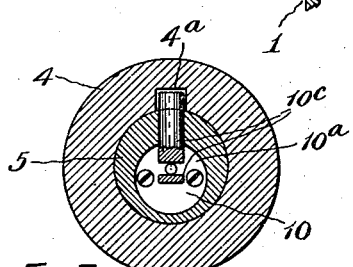
Fig. 3 is a section on the line 3—3, Fig. 2.

Referring first to the construction illustrated in Figs. 1, 2 and 3, my improved vision-obstructing device which is designated in its entirety by 1 is applied to the windshield $a$ of the automobile in position directly in front of the steering wheel $b$. The device 1 comprises a non-transparent plate or sheet of material which is preferably in the form of a sheet of metal formed in three sections $1^a$, $1^b$ and $1^c$, which are flexibly connected by hinged joints 2. The metal section $1^b$ is provided with stop lugs 3, 3 which are adapted to engage the adjacent sections $1^a$ and $1^c$ and prevent their movement through more than 180°. The middle section $1^b$ of the sheet is formed with an aperture in which is secured, as by welding, a boss 4 which is itself apertured to fit over a stud 5 that is designed to be permanently secured to the glass pane $a$ of the windshield. The glass is apertured to receive the stud as shown in Fig. 2, the stud being formed with a head $5^a$ to abut one side of the glass and being threaded to receive a securing nut 6 on the other side of the glass. The nut 6 is provided with a lock screw 7 and packing washers 8 and 9 are preferably interposed between the head $5^a$ and the nut 6 respectively and the glass.

The stud 5 is drilled to receive a lock mechanism 10 which comprises a lock cylinder $10^a$, tumblers $10^b$ and a bolt $10^c$ which is actuated in a well-known manner by rotation of the cylinder $10^a$ when a suitable key $10^d$ is inserted as indicated in Fig. 2. The lock bolt $10^c$ which is arranged radially of the stud 5 is adapted to be moved into and out of locking engagement with a recess $4^a$ formed in the boss 4. The boss 4 is formed with a suitable recess $4^b$ to accommodate the securing nut 6.

In the use of my improved device it is only necessary to open the sheet 1 to its flat position and pass the aperture of its boss 4 over the stud 5 so that the sheet 1 engages the glass of the windshield. Then by inserting the key $10^d$ the bolt $10^c$ can be thrown out to locking position thereby effectively securing the vision obstructing plate to the windshield glass.

Obviously the device obstructs the vision of the driver to such an extent that it is not feasible to operate the car, and with devices of this character in use any attempt to operate the car with the vision obstructing plate on the windshield would be recognized by passers by as unauthorized and presumably made with the intention of stealing the car.

When the owner of the machine re-enters it to drive away he needs only to turn the key in the lock 10 to permit withdrawal of the vision obstructing plate which can then be folded to compact form for convenient carrying.

When the plate 1 is removed from the windshield the driver should preferably throw the bolt $10^c$ of the lock to locking position thereby making it impossible for anyone seeking to tamper with the device to remove the stud 5 from the windshield. The lock 10 thus makes it impossible both when the vision obstructing plate is in use and when it is off the windshield to remove the plate or its securing stud 5 without breaking the windshield. Obviously the lock 10 can, if desired, be made to be controlled by the same key which controls the ignition lock of the machine.

Figure 5:
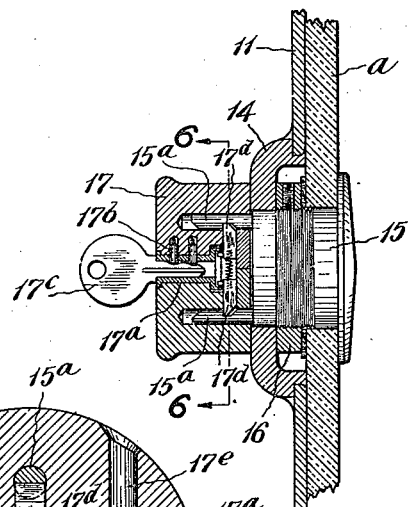
Fig. 5 is a vertical sectional view corresponding to Fig. 2 but showing a modified form of construction.
Figure 6:
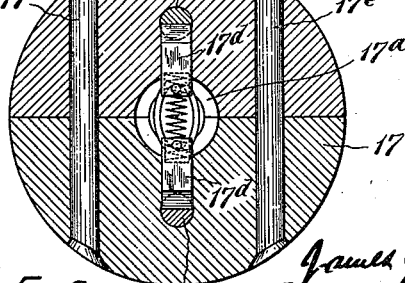
Fig. 6 is a section on the line 6—6, Fig. 5.

It will be apparent that the construction of my device can be varied in many ways. In Figs. 5 and 6, for example, I have shown a modified form of stud and lock. In this construction the sheet 11 is provided with an apertured boss 14 which engages a stud 15 secured to the windshield glass by a nut 16. The stud 15 is formed at its inner end with a pair of notched lock pins 15$^a$, 15$^a$ designed to be engaged by corresponding apertures in a lock 17. The lock is provided with a cylinder 17$^a$ which is controlled by tumblers 17$^b$ that are in turn controlled by a suitable key 17$^c$ and the cylinder is constructed to actuate a pair of locking bolts 17$^d$ that can be thrown into and out of engagement with the pins 15$^a$. The body of the lock 17 is preferably formed in two halves as shown in Fig. 6, these halves being permanently secured together by rivets 17$^e$.

In the use of the modified form of construction just described, when it is desired to apply the vision obstructing plate 11 to the windshield the lock 17 is removed from the stud 15, the plate 11 is mounted thereon and the lock 17 replaced and secured. In this second form of construction the lock 17 serves, as does the lock in the first form of construction, to prevent removal of the stud from the windshield both when the vision obstructing plate is secured thereto and when it is removed.

As previously indicated various modifications of the device as herein disclosed can be made without departing from the invention, the scope of which is indicated by the appended claims.

What I claim is:

1. In a device of the character described, the combination with the glass pane of a motor car windshield of a non-transparent plate adapted to cover a substantial part of the pane and means for detachably locking the plate to the windshield in position to obstruct the vision of the driver of the motor car, said means having its windshield engagement solely with the glass pane thereof.

2. The combination of a nontransparent plate consisting of a plurality of sections; means for hingedly connecting the said sections whereby folding upon each other is permitted in one direction only; and means for detachably locking the said plate to the windshield of an automobile so that the direction of folding will be towards the said windshield.

3. The combination of a glass windshield having an aperture therein; a stud secured in said aperture; a vision obstructing plate formed to engage the said stud; and means for detachably locking the plate to the stud.

4. The combination of a stud adapted to extend through an aperture in a glass windshield; means for securing the stud in the aperture; a vision-obstructing plate formed to engage the stud; and means for detachably locking the plate to the stud and preventing removal of the stud from the windshield.

5. The combination of a stud adapted to be secured in an aperture through a glass windshield; a vision-obstructing plate formed to engage the stud; and means carried by the stud for detachably locking the plate to the stud.

In testimony whereof, I hereunto affix my signature.

JAMES J. FURLONG.